United States Patent Office 3,326,668
Patented June 20, 1967

3,326,668
PELLETIZING METHOD
John A. Anthes, Bethel Borough, and Donald D. Phelps, Coraopolis, Pa., assignors to Dravo Corporation, Pittsburgh, Pa., a corporation of Pennsylvania
No Drawing. Filed Aug. 16, 1963, Ser. No. 302,701
1 Claim. (Cl. 75—3)

This invention relates to the preparation of metallic ores and mineral substances where the finely-divided or pulverized ore is formed into pellets and the pellets are then fired to harden them so that they can be stored, shipped and charged into furnaces without crushing or breaking.

The pelletizing of finely-divided iron ore is extensively practiced and the present invention will be specifically described in connection with the preparation of pellets prepared from iron ore, but is not limited thereto.

In the process of pelletizing, the pulverized ore is rolled into pellets in a pelletizing drum or disc. Typically the green pellets contain 8% to 12% of water, and depending on the ore the pellet resembles more or less a clay-like mass. The green pellets are either fired in a shaft furnace, or more frequently, they are charged to a uniform depth onto a traveling grate where they are first preheated, then passed through a firing treatment where they are heated to a high temperature to harden them, or they may be dried and preheated on a traveling grate and then fired in a rotary kiln. In the case of magnetite ore, oxidation takes place, and since this is an exothermic reaction, it yields heat that contributes to the hardening of the pellets. Subsequently, the pellets are cooled.

A plant for the preparation of pelletized ore involves a substantial investment and the output of a shaft furnace or traveling grate is restricted by the time required to bring the pellets up to firing temperature and then complete the firing, so that time is an important economic factor.

In the initial stages of firing, the pellets are contacted with hot gases that preheat them, raising their temperature from ambient temperature to a temperature around 800° F., after which they are rapidly subjected to much higher temperatures. This preheating effects the evaporation from the pellets of both the free water and the combined water in the mineral substances thereof, and it is a critical period in the heating process. This is because the exterior of the pellets may become quite hot while the interior is relatively cool and then as the heat penetrates, the moisture on the interior of the pellets is turned to steam. If the pellets are sufficiently porous or the heating is gradual, the pellets are not ruptured, but attempts to effect a rapid preheating with ones of a clay-like character result in excessive spalling and rupturing or weakening of the pellets, the pellets often exploding with noticeable violence.

The present invention relates to a process for the preparation of pellets from clay-like ores whereby the preheating time may be substantially decreased while still providing good quality pellets. This is effected by introducing a small amount of organic fibrous material into the pellets as they are being formed. The fibers will shrink as they lose moisture, thereby providing minute channels through which steam may escape, decreasing the density of the mass and rendering it more porous or gas pervious.

One material which has proved eminently satisfactory, and which may be economically used, is a semi-decayed fibrous vegetation, such as the product sold as peat moss, this being a familiar material extensively used by nurserymen and gardeners. It has capillary qualities that are desirable in the forming of green pellets and loses volume when heated. The material may be finely-subdivided into short, tiny fibers that can be readily mixed with the ore or picked up with the ore when placed in a pelletizing drum or disc. The fibers so used may be dry or wet depending on the amount of moisture contained in the ore and its tolerance for moisture in the pelletizing operation and, if dry, may even absorb some moisture from the ore.

Other short fine vegetable fibrous materials may also be used, such as saw dust, finely chopped straw or wood pulp, shredded bark, cotton lint, and similar fibrous materials. Care must be taken that an adequate amount of fiber be present, but an excess should be avoided. Little advantage is gained if the fibers are less than one-half of one percent of the weight of the ore and more than about 3% would be detrimentaal since this vegetable fiber is comprised largely of carbon compounds which can react undesirably as reducing agents in the subsequent firing of the pellets. Reducing agents, when present, tend to promote fusion in the interior of the pellets as a result of reduction to lower oxides as well as retard the exothermic process or oxidizing the magnetite, if present, and both of these effects are detrimental.

Attempts have heretofore been made to introduce bentonite into the pellets to accelerate the drying, but this has proved of limited benefit. The maximum amount of bentonite that can be used is not much above .5%. If appreciably more than this is used, the pellets will be excessively plastic and will not hold their form when they are charged into a furnace or charged into the bed of a pelletizing strand. They become so plastic as to squash or deform under pressure.

For example, utilizing Caland ore which is an iron ore from the Steep Rock Lake area north of Lake Superior and which produces clay-like pellets, we prepared three samples. In one case the pellets were formed from the ore with no addition. In the second case $5/10$ of 1% of bentonite was mixed into the ore, and in the third case 1% of peat moss finely divided was mixed into the ore. The peat moss such as that prepared for agricultural purposes was first passed through a hammer-mill and then through a 16 mesh (per inch) screen, and only the material that passed through the screen was used. Tests were then run to determine how fast the pellets could be heated without excessive spalling or bursting. For the pellets formed with no additive, the total time required for firing the pellets was 52 minutes and 40 seconds, including the cooling time following the firing, and even in this case some spalling was evident. The pellets with bentonite required 50 minutes, whereas those prepared with 1% of peat moss required only 37 minutes and 15 seconds.

Pellets made with peat moss have a higher porosity as shown by a lower bulk density; that is 122 pounds per cubic foot as compared to 134 for those made with bentonite, and 135 for those having no additive. Because of the porosity the pellets made with peat moss have a somewhat lower compression strength than the others but would be expected to have excellent reducibility. However, using the conventional tumble test there was only a 1% loss of material as screenings through a 28 mesh screen after 200 revolutions. This is regarded to be excellent performance, and the strength is entirely adequate for all practical purposes.

In another test using a similar clay-like iron ore from the same region, pellets were made with no additive and the total firing time, including cooling, was 51 minutes. with $5/10$ of 1% of bentonite added to the core the time was reduced in this case to 43 minutes and 45 seconds: With 1% of sawdust the time was 38 minutes and 50 seconds, and with 1% of finely chopped straw the time was 37 minutes and 30 seconds.

The quality of the pellets secured from peat moss in the preceding example was somewhat superior to the quality obtained from sawdust and straw, but the significance of this is uncertain since the ores were not identical. Sawdust gave slightly stronger pellets than bentonite, but the tumbling test was not as favorable as with the pellets fired with peat moss. The straw produced weaker pellets, but we attribute this to the fact that the straw was too coarse and not reduced to a sufficiently fine fibrous condition. While straw and sawdust appeared to be less beneficial than peat moss, they both made it possible to considerably shorten the heating-up time without having the pellets explode, and experience with the use of these materials should still further improve the result. All of the fibers are vegetable fibers, and all have the property of shrinking as they are dried out and heated. Of course, as the pellets become increasingly hot and dry toward the center, these vegetable substances will char and the resulting carbon, if too abundant, will act as a reducing agent to an undesirable extent, causing the interior of the pellets to be reduced to ferrous oxide for which reason we prefer not to use more than about 3% of the organic fiber in the pelletizing of iron ore. Also excessive porosity and lowering of density would result. Peat moss is abundant in much of the region where iron deposits for pelletizing are extensively located, is easy to prepare, and therefore because of its good performance is preferred when available. Knowing the nature of other vegetable fibers one skilled in the art may select those for use in other areas which are abundant or economical in a particular region, and the invention is not limited to the particular fibers here enumerated. Experiments have indicated that other vegetable fibers have the same property of shrinking as they dry out, and since when they shrink they provide space for the escape of trapped steam, such other fibers may also be used.

The vegetable material, such as sawdust or chopped straw may also be passed through a hammer-mill or other suitable comminution device if too coarse the same as the peat moss so that the materials mixed into the pellets are tiny fibers or small groups of fibers.

We claim:

In the forming and indurating of ore pellets from finely-divided clay-like ore particles containing moisture in the approximate range of 8% to 12% to prevent the rupture of the pellets from entrapped steam during preheating, the steps which comprise mixing with the moist ore peat moss comminuted to pass through a screen of the order of 16 mesh in the range of about 0.5% to about 3% by weight, rolling the mix into pellets, preheating the pellets to a temperature of around 800° F. during which preheating the particles of peat moss shrink to thereby effect release of steam from the interior of the pellets, and thereafter raising the temperature of the pellets to harden them.

References Cited

UNITED STATES PATENTS

| | | | |
|---|---|---|---|
| 569,820 | 10/1896 | Dickson | 75—3 |
| 2,295,811 | 9/1942 | Steffensen | 75—5 |
| 2,450,343 | 9/1948 | Howard et al. | 75—3 |
| 2,750,273 | 6/1956 | Lellep | 75—3 |
| 2,865,731 | 12/1958 | Crowe | 75—3 |
| 2,925,336 | 2/1960 | Stowasser | 75—3 |

FOREIGN PATENTS 24,845   1908   Great Britain.

BENJAMIN HENKIN, *Primary Examiner.*